(12) United States Patent
Mendlovic et al.

(10) Patent No.: US 6,344,893 B1
(45) Date of Patent: Feb. 5, 2002

(54) SUPER-RESOLVING IMAGING SYSTEM

(75) Inventors: David Mendlovic, Petach Tikva; Zeev Zalevsky, Rosh Haayin; Naim Konforti, Holon; Emanuel Marom, Tel Aviv; Gal Shabtay; Uriel Levy, both of Petach Tikva; Sharon Karako, Yahud, all of (IL)

(73) Assignee: Ramot University Authority for Applied Research and Industrial Development Ltd., Tel Aviv (IL)

( * ) Notice: Subject to any disclaimer, the term of this patent is extended or adjusted under 35 U.S.C. 154(b) by 0 days.

(21) Appl. No.: 09/596,445

(22) Filed: Jun. 19, 2000

(51) Int. Cl.[7] ............................. G01C 3/00; G01C 3/08; G02B 27/42
(52) U.S. Cl. ..................... 356/3.14; 356/4.04; 359/558; 235/462.22; 235/462.23; 235/462.24; 235/462.35
(58) Field of Search ................................. 356/4.04, 3.14, 356/3.15; 359/558, 559; 235/462.22, 462.23, 462.24, 462.32, 462.35

(56) References Cited

U.S. PATENT DOCUMENTS

| | | | |
|---|---|---|---|
| 4,253,752 A | * 3/1981 | Ichihara | 356/3.14 |
| 4,716,414 A | 12/1987 | Luttrell et al. | |
| 4,748,316 A | 5/1988 | Dickson | |
| 4,820,911 A | 4/1989 | Arackellian et al. | |
| 4,978,860 A | 12/1990 | Bayley et al. | |
| 5,315,095 A | 5/1994 | Marom et al. | |
| 5,315,411 A | 5/1994 | Blanding | |
| 5,638,211 A | 6/1997 | Shiraishi | |
| 5,657,147 A | 8/1997 | Yoshikawa et al. | |
| 5,680,253 A | 10/1997 | Hasegawa et al. | |
| 5,684,620 A | 11/1997 | Schoon | |

FOREIGN PATENT DOCUMENTS

| | | |
|---|---|---|
| EP | 0 777 147 | 6/1997 |
| WO | WO 00/59206 | * 10/2000 ............. H04N/1/04 |

OTHER PUBLICATIONS

W. Lukosz, "Optical Systems with Resolving Powers Exceeding the Classical Limit", *JOSA* 56(11), Nov. 1966, pp. 1463–1472.

A. I. Kartashev, "Optical Systems with Enhanced Resolving Power", *Opt. Spectry.* 9, 1960, pp. 204–206.

H. Bartelt and A. W. Lohmann, "Optical Processing of One–Dimensional Signals", *Opt. Commun.* 42(2), Jun. 1982, pp. 87–91.

W. Gartner and A. Lohmann, "An Experiment Going Beyond Abbe's Limit of Diffraction", *Z. Physik* 174, 1963, pp. 18–23.

D. Mendlovic, A. W. Lohmann, N. Konforti, I. Kiryuschev and Z. Zalevsky, "One–Dimensional Superresolution Optical System for Temporally Restricted Objects", *Appl. Opt.* 36(11), Apr. 1997, pp. 2353–2359.

D. Mendlovic and A. W. Lohmannn, "Space–Bandwidth Product Adaptation and its Application to Superresolution: Fundamentals", *JOSA* 14(3), Mar. 1997, pp. 558–562.

(List continued on next page.)

*Primary Examiner*—Thomas H. Tarcza
*Assistant Examiner*—Fred H Mull
(74) *Attorney, Agent, or Firm*—Rosenman & Colin LLP

(57) ABSTRACT

A super-resolving imaging apparatus employs diffractive optical elements placed on the imaging lens. This element, and the use of a modified Scheimpflug arrangement allow the conversion of degrees of freedom in one axis of a field of view to a larger degree of freedom in another axis in order to obtain a high resolution image with a wide depth of focus and large field of view. Replicas created by the diffractive elements are mutually shifted by subpixel amounts, and are combined using a Gabor transform, which is facilitated by a spatial mask placed over the detector array. The apparatus is suitable for performing distance estimation on an object within the field of view.

55 Claims, 11 Drawing Sheets

OTHER PUBLICATIONS

D. Mendlovic and A. W. Lohmannn, and Z. Zalevsky, "Space–Bandwidth Product Adaptation and its Application to Superresolution: Examples", *JOSA* 14(3), Mar. 1997, pp. 563–567.

H. Dammann et al., "High Efficiency In–Line Multiple Imaging By Means of Multiple Phase Holograms", *Opt. Commun.* 3(5), Jul. 1971, pp. 312–315.

D. Mendlovic et al., "Shift and Scale Invariant Pattern Recognition using Mellin Radial Harmonics", *Opt. Commun.* 67(3), Jul. 1988, pp. 172–176.

D. Mendlovic et al., "Optical–Coordinate Transformation Methods and Optical–Interconnection Architectures", *Appl. Opt.* 32(26), Sep. 1993, pp. 5119–5124.

\* cited by examiner

IMAGE             OBJECT

SUPER-RESOLVING IMAGING SYSTEM

BACKGROUND OF THE INVENTION

1. Field of the Invention

This invention relates to an imaging system. More particularly this invention relates to a super-resolving imaging apparatus having increased depth of field which can be employed in collision avoidance systems for vehicles, and for distance estimation applications in general.

2. Description of the Related Art

Nowadays distance estimation is mainly performed using two basic techniques: active sensing and image processing. In the active sensing category are included radar-type devices which illuminate the region of interest by scanning and then estimating the distance by measuring the time between the transmitted and received signals. Although such devices are relatively simple, they are presently too expensive to be practical in private vehicles. These devices have limited resolution, and are generally too slow for real-time collision avoidance applications for terrestrial vehicles.

The other major category distance estimation devices are passive systems based on detector arrays, such as CCD, CMOS, and ICCD gated CCD, which employ advanced image processing algorithms. Such systems, in order to obtain algorithmic convergence, require high resolution and thus have a restricted field of view. These systems also suffer from a limited depth of focus. In addition, the postprocessing algorithms that perform the time-to-impact evaluation require heavy computation. Despite their present limitations, the passive systems are constantly being upgraded in technological performance, and are being dramatically reduced in price.

Technical problems in the field of optical scanning are similar to those of the immediate field of the invention. Imaging based scanners are required to convert spatial degrees of freedom in order to obtain high horizontal and vertical resolution, and adequate depth of focus. Here are several related patents that deal with high resolution and extended depth of field scanning of objects as bar codes. Several disclosures are known to deal with similar problems. U.S. Pat. No. 5,657,147 discloses an optical scanner which includes a light source and optical deflector for scanning a light flux from the light source. Beams with extended confinement for scanning purposes, as proposed in U.S. Pat. No. 5,315,095, may be the basis for scanners usable, for example in a bar code reader, by generating a multitude of Gaussian beams derived from a common light source. A scanner using this technique has an extended working range. An optical scanner for reading barcodes detected within a large depth of field is disclosed in U.S. Pat. No. 4,748,316, which proposes the use of a plurality of scan lines having different focal lengths. If at least one of the scan lines is small relative to irregularities of the surface on which the label appears, an extended depth of scanning can be achieved. U.S. Pat. No. 4,820,911, describes an apparatus which is adapted to be hand-held and utilizes anamorphic optics for scanning and reading a bar code. The optics provides a beam having an oblong cross-section in the nominal plane of the bar code. U.S. Pat. No. 5,680,253 discloses a light beam scanning apparatus comprising a first and second diffraction grating plate which provides a high resolution scanning apparatus utilizing mass producible holograms instead of utilizing auxiliary optical systems. An optical system for a large depth of field barcode scanner was suggested in U.S. Pat. No. 4,978,860 to Bayley et al. The working range of this device is determined not by the lens aperture, but by the dimension and orientation of the detector array using a modified Scheimpflug arrangement.

Nevertheless, the existing prior art devices do not fully solve the technical problems required for imaging systems to be used for distance estimation and collision warning for vehicles.

SUMMARY OF THE INVENTION

The invention provides super-resolving devices and their applications. More particularly, it provides geometrical super-resolution, i.e. resolution that is better than the resolution defined by the geometry of the detector array. In addition, the disclosed technology also provides apparatus to extend the depth of field of the system.

It is a primary object of some aspects of the present invention to improve imaging systems in the fields of distance estimation and collision warning for vehicles.

It is another object of some aspects of the present invention to provide apparatus for estimating distance that affords wide depth of focus and a large horizontal field of view.

It is yet another object of some aspects of the present invention to improve the speed of distance estimation in collision warning systems.

These and other objects of the present invention are attained by imaging apparatus in which special optical elements placed on the imaging lens and the detector array allow the conversion of degrees of freedom in one axis of a field of view to a larger degree of freedom in another axis in order to obtain a high resolution image with a wide depth of focus and large field of view suitable for performing distance estimation on an object within the field of view.

The invention employs a numerical algorithm which is simple and can be rapidly performed to yield the desired result.

According to some aspects of the invention a detector array with a specially designed optical element is directed toward a large volume of space in which a target may be found. In certain applications, such as vehicular warning systems, the vertical field of view required is significantly smaller than the actual vertical field of view of the apparatus. The special optical element converts the unneeded vertical pixels (degrees of freedom) into an increased depth of focus resolution. The apparatus provides a view comprising several horizontal "stripes" wherein each stripe represents a planar object and corresponds to an optical element which has both a unique focal length and thus a unique depth of focus region. In a preferred embodiment of the invention a distance evaluation is performed by evaluating the amount of misfocus of each of the various stripes.

In an alternate preferred embodiment of the invention the distance estimation is performed by employing two cameras, each having similar structure to that of the first embodiment. A triangulation calculation is performed in order to extract the distance of the object seen by both cameras.

In another aspect of the invention, a diffractive optical element that is attached to the aperture of the system further improves the geometrical resolution of the imaged scene by converting vertical degrees of freedom into horizontal resolution. A system including a camera employing the apparatus according to the invention provides high resolution performance both in the vertical and in the depth axes together enabling determination of the desired distance estimation.

In yet another aspect of the invention an optimal filtering approach is applied in order to perform the recognition of the high-resolution image.

The invention provides a method of imaging, which is performed by tilting an image plane with respect to an object plane, defining pixel units on the image plane, and defining a field of view on the object plane, wherein a vertical dimension of the field of view differs from a horizontal dimension thereof. A plurality of images of the field of view are formed on the image plane, the images being spatially interrelated by subpixel shifts. The formed images are then super-resolved into an enhanced image.

According to an aspect of the invention the step of super-resolving is geometrically performed by transforming the images according to a Gabor transform.

According to another aspect of the invention the step of super-resolving also has applying a spatial mask to the image plane.

According to still another aspect of the invention the images are oriented according to the larger of the horizontal dimension and the vertical dimension.

In a further aspect of the invention there is a further step of deconvolving out-of-focus point spread functions of the images, preferably using a Wiener filter.

According to an aspect of the invention the images are formed by time multiplexing.

According to another aspect of the invention the images are formed by wavelength multiplexing.

According to yet another aspect of the invention the images are formed by diffractive gratings.

According to still another aspect of the invention the images are transformed according to a Mellin transform, and time-to-impact analysis is performed on the transformed images.

In a further aspect of the invention the images are transformed such that their impulse responses are diagonally displaced from one another on the image plane with respect to horizontal and vertical axes of the images defined thereon.

The invention provides a method of imaging which is performed by simultaneously viewing a plurality of elongated fields of view on a target, wherein a focus of each field of view has a different optical displacement from an imaging surface, diffracting beams of radiant energy that travel along a path extending between the fields of view and the imaging surface to form elongated replicas of each elongated field of view, the replicas being mutually shifted in a direction of elongation thereof, and being mutually displaced in a direction that is substantially transverse to the direction of elongation. The method is further performed by combining the replicas of each field of view into corresponding enhanced images, each enhanced image having a higher resolution than the resolutions of its associated replicas.

Preferably the image plane is tilted with respect to planes of the fields of view, and the method further comprises determining defocus of the fields of view.

According to another aspect of the invention the method further comprises performing a Mellin transform on an image formed from all of the replicas.

In a further aspect of the invention the method comprises conducting the beams through a spatial mask that is constructed such that zero values of a Fourier transform of a function representing spatial responsivity of pixels on the image plane are eliminated.

The invention provides a method of imaging, which is performed by tilting an image plane with respect to first and second object planes intersecting a target, wherein a displacement of the second object plane from the image plane is greater than the displacement of the first object plane from the image plane. The method includes defining pixel units on the image plane, defining a first field of view on the first object plane, and defining a second field of view on the second object plane, wherein vertical dimensions of the first and second fields of view differ from respective horizontal dimensions thereof. The method further comprises forming a plurality of first images of the first field of view on the image plane, the first images being spatially interrelated by subpixel shifts, and simultaneously forming a plurality of second images of the second field of view on the image plane, the second images being spatially interrelated by subpixel shifts. The method further comprises super-resolving the first images into a first enhanced image, and super-resolving the second images into a second enhanced image, and comparing a defocus magnitude of the first field of view with a defocus magnitude of the second field of view.

Preferably the first field of view is obtained through a first region of a lens, and the second field of view is obtained through a second region of the lens.

According to an aspect of the invention the step of super-resolving is geometrically performed by transforming the first images and the second images according to a Gabor transform.

According to another aspect of the invention the step of super-resolving further comprises applying a spatial mask to the image plane.

According to still another aspect of the invention the plurality of first images and the plurality of the second images are oriented according to the larger of the horizontal dimension and the vertical dimension.

According to an aspect of the invention the plurality of images are formed by spatially transforming coordinates to establish a panoramic field of view, in which has a horizontal field differs in magnitude from the vertical field of view.

In a further aspect of the invention the method further comprises determining a displacement between the image plane and the target, responsive to the step of comparing defocus magnitudes.

In another aspect of the invention the first images and the second images are spaced apart, and a position of the target is determined with respect to the first and second images by triangulation.

The invention provides an imaging apparatus, including a lens which has a field of view that includes an object plane, wherein a horizontal dimension of the field of view differs from a vertical dimension thereof. A detector of radiant energy has an image formed thereon by the lens, wherein the detector has a plurality of pixel elements, and a spatial mask is disposed proximate the detector. The mask has a plurality of subpixel apertures formed therein. The apparatus further includes a diffractive element disposed proximate the lens, wherein a diffracted light beam forms the image on the detector, and the image comprises a plurality of focused replicas of the field of view, the focused replicas being offset from one another by subpixel shifts, and a prism is disposed between the lens and the detector for refracting radiant energy passing therethrough.

According to an aspect of the invention the spatial mask is formed so as to eliminate zero values from a Fourier transform of a response function of the pixel elements.

According to another aspect of the invention the diffractive element is a one dimensional zone plate strip.

According to yet another aspect of the invention the replicas are mutually shifted in a direction of elongation of the Barfield of view, and are spaced apart from one another in a direction that is substantially transverse to the direction of elongation.

According to still another aspect of the invention the apparatus further includes a signal processing unit which is responsive to the detector, and is programmed to combine the replicas into a single image which has a greater resolution than the repilicas.

In a further aspect of the invention the signal processing unit performs a Gabor transform on a signal output of the detector.

In another aspect of the invention the signal processing unit performs a Mellin transform on a signal output of the detector in conjunction with time-to-impact analysis.

According to an aspect of the invention there are first and second lenses spaced apart from one another.

According to another aspect of the invention the signal processing unit is programmed to determine a displacement by triangulation of a target using a first image thereof obtained from the first lens and a second image thereof obtained from the second lens.

According to still another aspect of the invention an aperture of the lens is divided into a first region and a second region, wherein the signal processing unit is programmed to determine a displacement by triangulation of a target, using a first image thereof obtained from the first region and a second image thereof obtained from the second region of the lens.

The invention provides an imaging apparatus, including a plurality of lenses each having a corresponding field of view that includes an object plane, wherein a horizontal dimension of the field of view differs from a vertical dimension thereof, the lenses having different focal lengths. The apparatus further includes a detector of radiant energy having a plurality of corresponding images formed thereon by the lenses, a spatial mask disposed proximate the detector, the mask having a plurality of subpixel apertures formed therein. The apparatus further includes a diffractive element disposed proximate each lens, wherein each image on the detector has a plurality of focused replicas of the corresponding field of view, the focus replicas are offset from one another by subpixel shifts, and a prism is disposed between the lens and the detector for refracting radiant energy passing therethrough onto the detector.

In a further aspect of the invention the prism has a plurality of prisms, each prism refracting radiant energy that is received from a corresponding lens.

Preferably the spatial mask is formed so as to eliminate zero values from a Fourier transform of a response function of the pixel elements.

According to an aspect of the invention the diffractive element is a one dimensional zone plate strip.

According to another aspect of the invention the replicas are mutually shifted in a direction of elongation of the corresponding field of view, and are spaced apart from one another in a direction that is substantially transverse to the direction of elongation.

According to yet another aspect of the invention the apparatus further includes a signal processing unit which is responsive to the detector, and is programmed to combine the replicas of each the field of view into a corresponding single image which has a greater resolution than the replicas.

According to another aspect of the invention the lens includes means for spatially transforming the plurality of focused replicas to establish a panoramic field of view, in which has a horizontal field differs in magnitude from the vertical field of view.

According to still another aspect of the invention the signal processing unit performs a Gabor transform on a signal output of the detector.

In a further aspect of the invention the signal processing unit performs a Mellin transform on a signal output of the detector.

Preferably the signal processing unit deconvolves out-of-focus point spread functions of the images.

According to an aspect of the invention the signal processing unit employs a Wiener filter for deconvolving the point spread functions.

BRIEF DESCRIPTION OF THE DRAWING

For a better understanding of these and other objects of the present invention, reference is made to the detailed description of the invention, by way of example, which is to be read in conjunction with the following drawings, wherein.

DESCRIPTION OF THE PREFERRED EMBODIMENT

In the following description, numerous specific details are set forth in order to provide a through understanding of the present invention. It will be apparent however, to one skilled in the art that the present invention may be practiced without these specific details. In other instances well known circuits, control logic, and the details of computer program instructions for conventional algorithms and processes have not been shown in detail in order not to unnecessarily obscure the present invention.

Creation of Wide Depth of Focus

Figure 1:
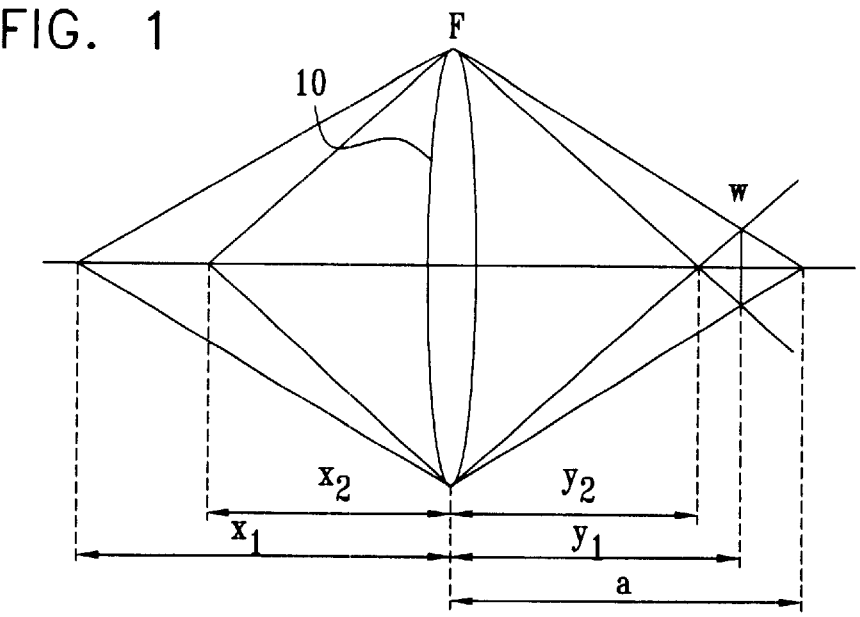
FIG. 1 is a schematic illustration of a lens in accordance with some aspects of the invention.

Turning now to the drawings, and more particularly to FIG. 1 thereof, an optical lens 10 is shown as a component of a preferred embodiment of the invention suitable for distance estimation and vehicular collision avoidance systems. It will be appreciated that the exact longitudinal position of the target object is generally unknown, and accordingly a large depth of focus is required from the capturing device or camera. It is desirable to detect the target detection within a wide working range of distances between the camera and the target object. In the preferred embodiment the vertical dimension of the field of view of the imaging device is smaller than the horizontal dimension. Although the terms "horizontal" and "vertical" are employed in the explanations herein, those skilled in the art will appreciate that these terms can be exchanged as required for a particular application without departing from the spirit of the invention.

Figure 2:
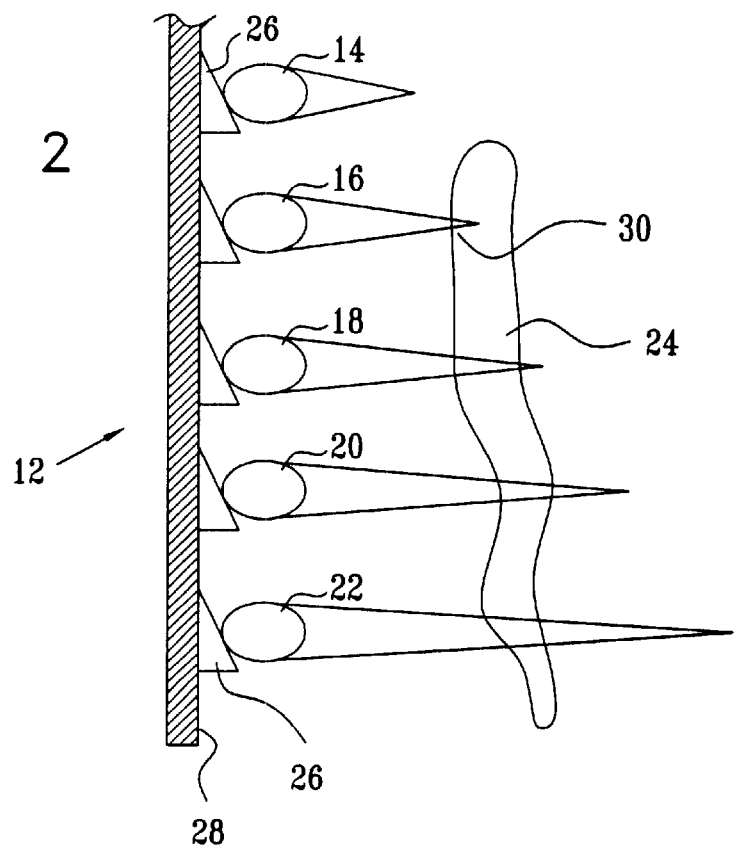
FIG. 2 is a partially schematic sectional view of an imaging apparatus in accordance with a preferred embodiment of the invention.

As shown schematically in FIG. 2 a special diffractive optical element 12 is attached to an imaging lens (not shown) of the camera. the optical element 12 is constructed as several strips wherein each strip includes a cylindrical lens 14, 16, 18, 20, 22, each lens having a different focal length, and consequently its own depth of focus region. While cylindrical lenses are employed in the preferred embodiment, the invention can be practiced with non-cylindrical lenses. The optical element 12 is realized using a plurality of one dimensional lenses, or one-dimensional zone plate strips. The focal lengths of the cylindrical lenses of the strips are designed such that, in cooperation with the imaging lens, the combined working ranges include a target 24. The combined working range of the cylindrical lenses 14, 16, 18, 20, 22 not only provides the required depth of focus to image the target 24, but the field of view of each cylindrical lens also has sufficient width to permit the operation of a sub-pixel algorithm to improve resolution. A set of prisms 26 is also disposed between the cylindrical lenses 14, 16, 18, 20, 22 and the detector plane 28 in order to achieve a modified Scheimpflug arrangement and to obtain the images in a proper position on the detector plane.

The sub-pixel algorithm is preferably the technique disclosed in our copending Israel Application No. 129258, which is hereby incorporated by reference.

The depth of focus is achieved using several one dimensional ("1-D") zone plate strips. Each strip corresponds to a different region of space where optimal focusing resolution is obtained. The combination of several such 1-D zone plates provides a wide range of focus depth. A 1-D zone plate can be described by $$g(x, y) = e^{-\frac{i\pi x^2}{\lambda f}} \tag{1}$$

where i represents the square root of −1, x is the horizontal coordinate, lambda is the wavelength, and f is the focal length. Note that when two lenses having focal lengths of f1 and f2 respectively are attached to one another, the total focal length becomes:

$$1/ft = 1/f1 + 1/f2 \tag{2}$$

Referring again to FIG. 1, one may write the following equation set which apply to the lens 10:

$$\frac{D}{y_2} = \frac{w}{a - y_2} \tag{3}$$

$$\frac{D}{y_1} = \frac{w}{y_1 - a}$$

where D is the aperture of the imaging lens 10, F is its focal length and w is the maximal size of the focus spot 30 to be obtained over the detector plane 28. The distance a indicates the position of the detector plane 28.

Now, using the imaging relations, one may obtain:

$$\frac{1}{y_1} + \frac{1}{x_1} = \frac{1}{F} \tag{4}$$

$$\frac{1}{y_2} + \frac{1}{x_2} = \frac{1}{F}$$

After simple mathematical manipulations one may obtain the expression for the depth of focus region:

$$x_1 = \frac{1}{\frac{1}{F} + \frac{w - D}{Da}} = \frac{FDa}{Da + wF - DF} \tag{5}$$

$$x_2 = \frac{1}{\frac{1}{F} - \frac{w + D}{Da}} = \frac{FDa}{Da - wF - DF}$$

and $$\Delta = x_2 - x_1 \tag{6}$$

$$= \frac{2awDF^2}{a^2D^2 - 2aD^2F + D^2F^2 - w^2F^2}$$

Figure 3:
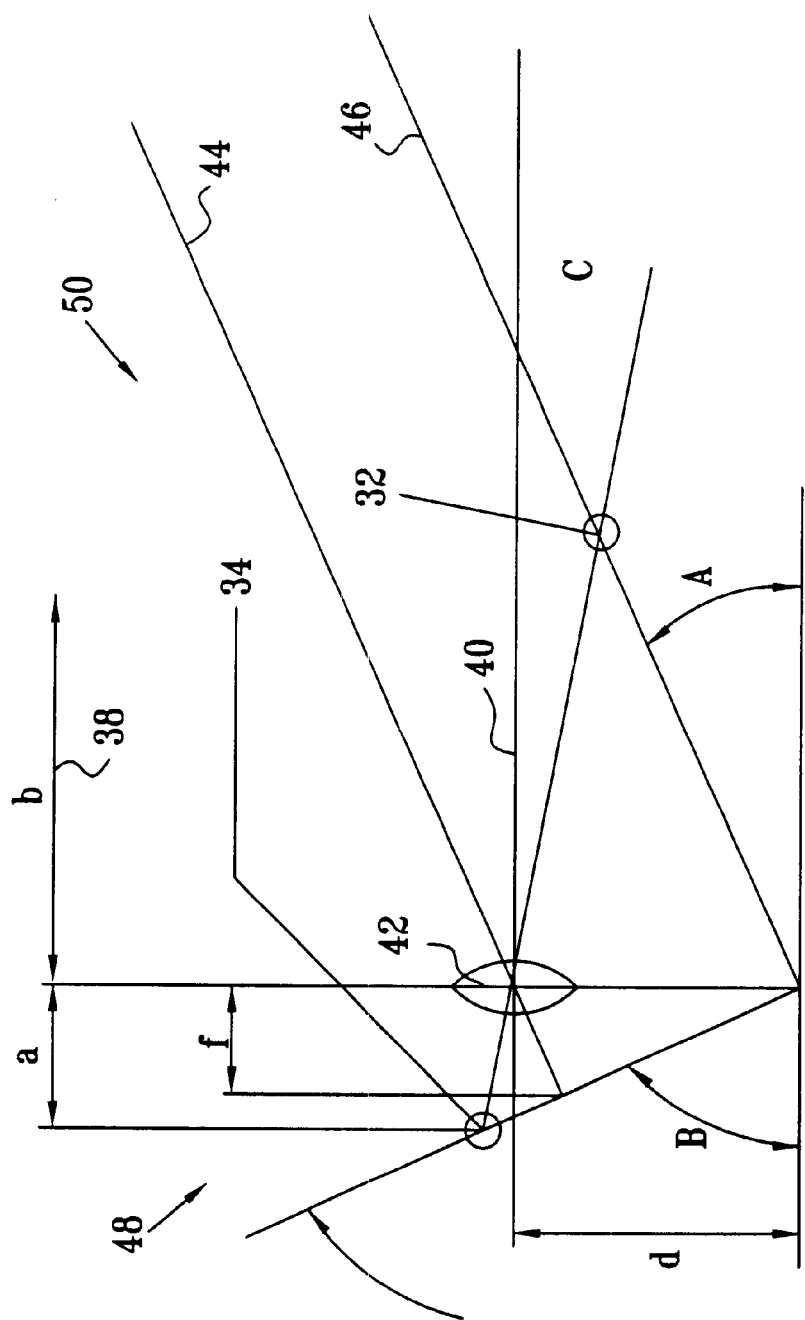
FIG. 3 schematically illustrates a Scheimpflug arrangement in accordance with the prior art.

According to Scheimpflug, if one tilts the object plane as well as the imaging plane (detector array plane) away from a conventional transverse orientation, a wide depth of focus may be obtained. As disclosed hereinbelow, the arrangement of Scheimpflug may be improved by using a prism arrangement, in which the detector and the lens plane remain parallel. FIG. 3 presents the basic concept introduced by Scheimpflug, in which an object point 32 is captured as an image point 34. The Scheimpflug arrangement 36 may be formulated with the following equations, wherein the quantities a, b, d, and f are distances, and quantities A, B, and C are angles, as indicated in FIG. 3. Line 38 is parallel to the lens axis 40 of the lens 42. Line 44 is parallel to line 46.

For the image side 48 of the Scheimpflug arrangement 36:

$$a(\tan B - \tan C) = d$$

$$f(\tan B + \tan A) = d \tag{7}$$

and for the object side 50:

$$b(\tan A + \tan C) = d \tag{8}$$

Thus, $$\frac{1}{a} + \frac{1}{b} = \frac{1}{d}[(\tan B - \tan C) + (\tan A + \tan C)] \tag{9}$$

$$= \frac{1}{d}(\tan B + \tan A)$$

$$= \frac{1}{f}$$

Figure 4:
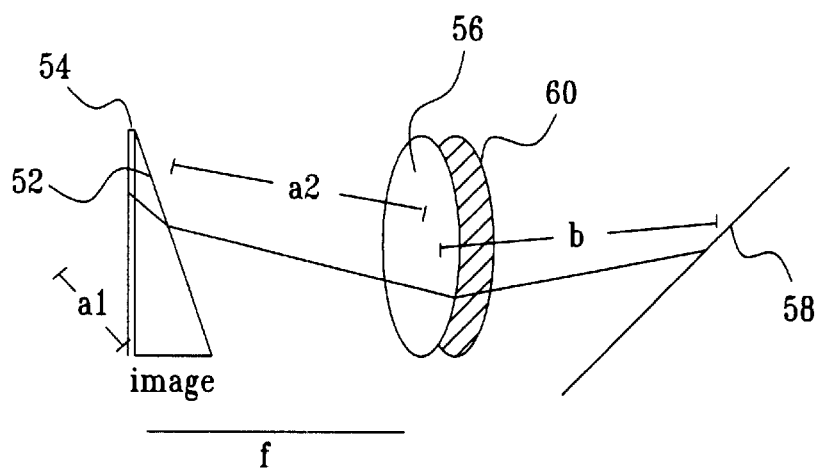
FIG. 4 is a schematic view of an imaging apparatus having a plurality of lenses in accordance with an alternate embodiment of the invention.

FIG. 4 illustrates a modification of the Scheimpflug arrangement which is used in the preferred embodiment. A prism 52 is inserted between the detector 54 and the lens 56 to create the required phase delay. Here, instead of tilting the image plane, the path difference is obtained using a prism. Thus, if an object 58 is to be placed somewhere on the object plane, it will be focused on the plane of the detector 54. It will be understood that in practice the object has a depth dimension that is perpendicular to the plane of the page, and that the field of view of the lens 56 also has a depth dimension.

The magnification is:

$$M = \frac{b}{a} \qquad (10)$$

and since $$a = \frac{1}{\frac{1}{f} - \frac{1}{b}} \qquad (11)$$

Let $b_{min}$, $b_n$, $b_{max}$, $a_{min}$, $a_n$, $a_{max}$ represent the minimal, nominal and the maximal values for the distances b and a in FIG. 4 respectively, wherein a=a1+a2, and f is the focal length of the lens 56. If L is the size of the detector then given the requirement for the nominal and maximal values of b, one may obtain the following relations:

$$a_{max} = \frac{d + L\sin B - a_{min}\tan A + \frac{a_{min}d}{b_{max}}}{\tan B} \qquad (12)$$

$$a_{min} = \frac{1}{\frac{1}{f} - \frac{1}{b_{max}}}$$

$$b_{min} = \frac{1}{\frac{1}{f} - \frac{1}{a_{max}}}$$

Knowing the size of the target and the size of the detector's pixels, and calculating the range of the magnification M, one may obtain the required geometrical super-resolution of the improvement.

Note that a rough estimation for the distance d may be obtained according to:

$$d = \frac{Lb_{min}}{f} \qquad (13)$$

It is important to see that various considerations must be taken into account when implementing the depth of focus configuration based upon the Scheimpflug approach combined with geometrical super-resolution. First, replications are obtained on the array plane of the detector 54 due to a diffractive optical element 60 attached to the lens aperture. As is disclosed in further detail hereinbelow, the diffractive optical element 60 is used to obtain the geometrical super-resolution, and the gratings of this element must be sufficiently close to each other so that all of them will stay on focus on the detector plane, which is effectively tilted with respect to the aperture of the lens. Second, due to the replication of the imaged object, the geometrical super-resolution approach to obtain improved resolution requires a sensitive detector, since an increase in the number of replicas will reduce accordingly the energy of each replica.

Figure 5:
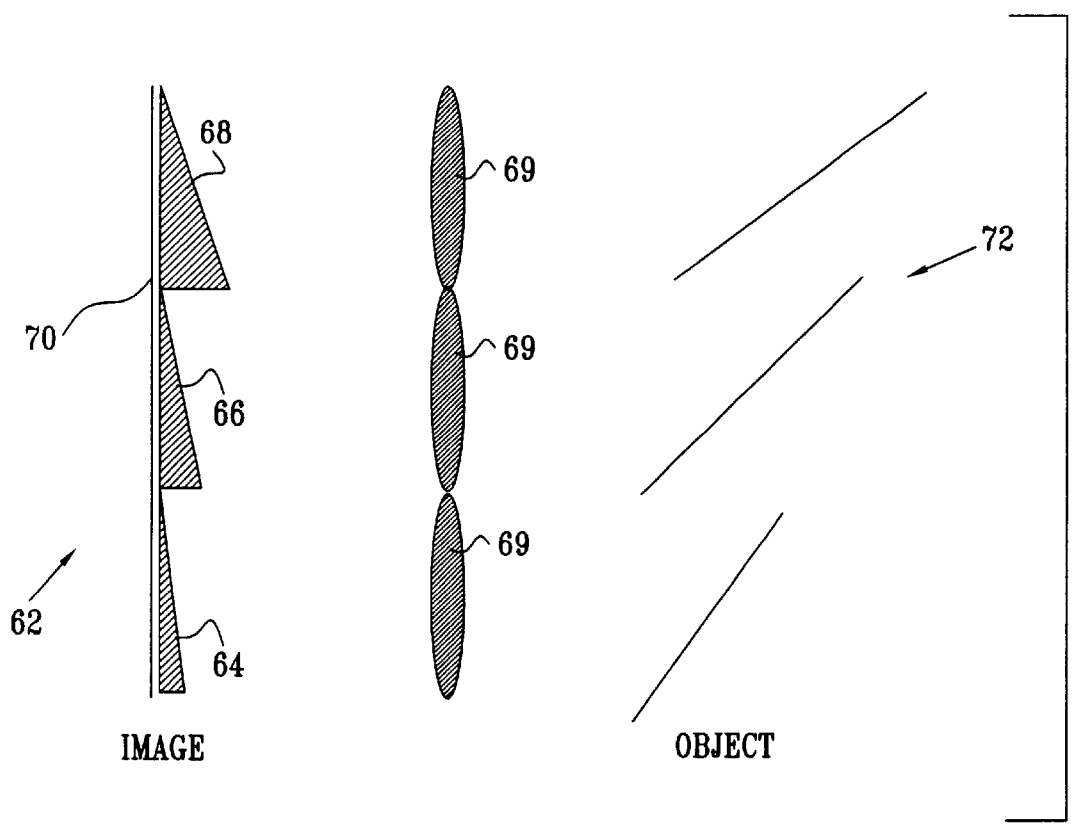
FIG. 5 is a schematic view of an imaging apparatus having a plurality of prisms in accordance with an another alternate embodiment of the invention.

The robustness of the arrangement illustrated in FIG. 4 may be increased by attaching several prisms to the detector array plane, as shown in FIG. 5. In the system 62, there are a plurality of prisms 64, 66, 68 adjacent the plane of the detector array 70 which achieve functional optical tilting of the image plane with respect to the object plane in accordance with the modified Scheimpflug arrangement discussed above. Each prism is a constituent of a different horizontal strip, and each lies in an optical path leading from a different depth of focus region through the lenses 69. In addition it performs vertical replication of the imaged scene 72, the replicas being directed to the locations of each one of the prism stripes. Once again this approach is possible due to the fact that the vertical field of view of the optical system 62 is much narrower than the horizontal one.

Panoramic Field of View:

As previously mentioned a high ratio exists between the required horizontal and vertical field of views. The required horizontal field of view is much larger. Since most of the detectors are squared the required ratio may be obtained by using special optical elements. There are several possibilities for obtaining the desired panoramic field of view that is actually a sophisticated coordinate transformation.

Figure 6:
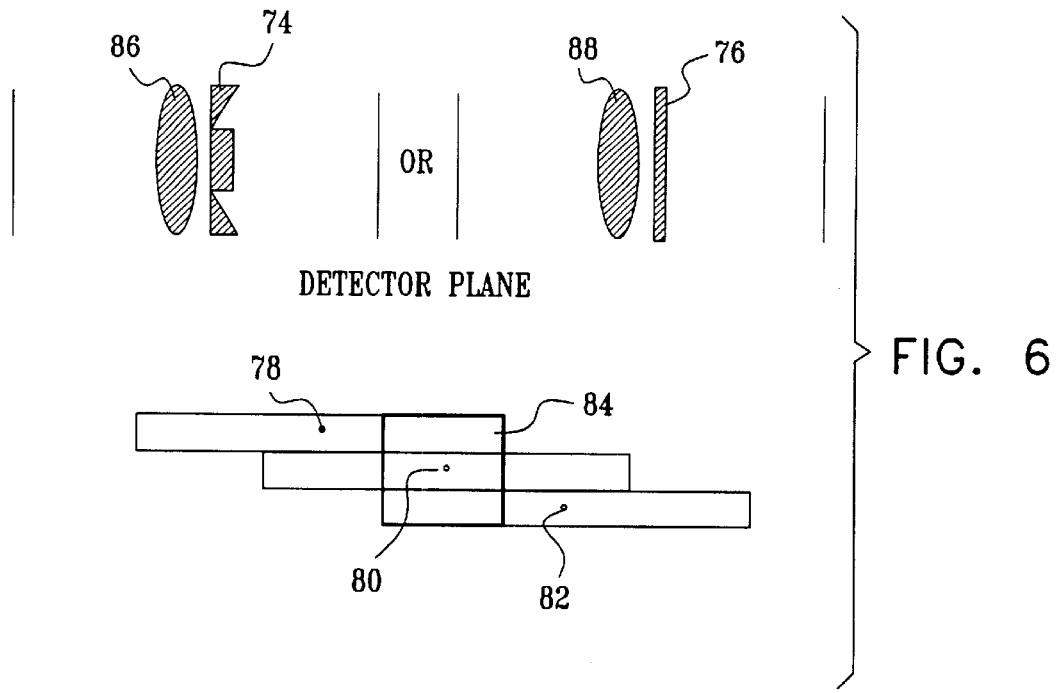
FIG. 6 is a schematic illustration of an optical arrangement for creating a panoramic field of view in accordance with an alternate embodiment of the invention.

One approach uses the optical setup of FIG. 6 that contains a single optical element, which can be either of the optical elements 74, 76. This element has an impulse response of several spots 78, 80, 82 having diagonal locations on the detector plane 84. When an input image is entered it is replicated as seen in image point 34 (FIG. 3) and a panoramic field of view is obtained. This approach involves only one element. The element is attached to one of the imaging lenses 86, 88 and it consists out of several strips each having a prism that tilts the light horizontally and vertically and resulting in an impulse response that produce spots with diagonal locations. Here the term "diagonal" is referenced to the horizontal and vertical orientations of the field of view. In practice a squared detector array is used to obtain unequal ratio between the horizontal and the vertical fields of view as required. If for instance the impulse response is three diagonal spots, then the ratio between the horizontal and the vertical field of view (FOV) in the panoramic image is 9 (FOV/3 for the vertical dimension and FOV*3 for the horizontal dimension).

The disadvantage of such an approach is that since each strip is itself narrower than the lens aperture. Thus the vertical resolution of the image is impaired. The resolution reduction is proportional to the number of strips. The main advantage of this approach is that since it contains prisms it is not sensitive to wide wavelengths band illumination.

An alternate approach also utilizes only one element attached to the lens, which has a similar impulse response as the first approach. However, in this case the element does not contain strips of prisms but it is one unified element, still having a diagonally located impulse response. It may be for instance a Dammann grating, which is known from the publications "High-Efficiency In-Line Multiple Imaging By Means Of Multiple Phase Holograms," H. Dammann and K. Gortler, Opt. Commun. 3, 312–315 (1971); and "Coherent Optical Generation And Inspection Of Two Dimensional Periodic Structures", H. Dammann and E. Klotz, Opt. Acta 24, 505–515 (1977). The main advantage of this configuration is that the vertical resolution is unimpaired, since the element covers the entire lens plane and it is not divided into stripes. Its disadvantage is that it may be sensitive to wide band wavelength illumination since it does not consist of prisms. This sensitivity may be reduced if the element is produced with etching depths that are much longer than one wave-length.

Figure 7:
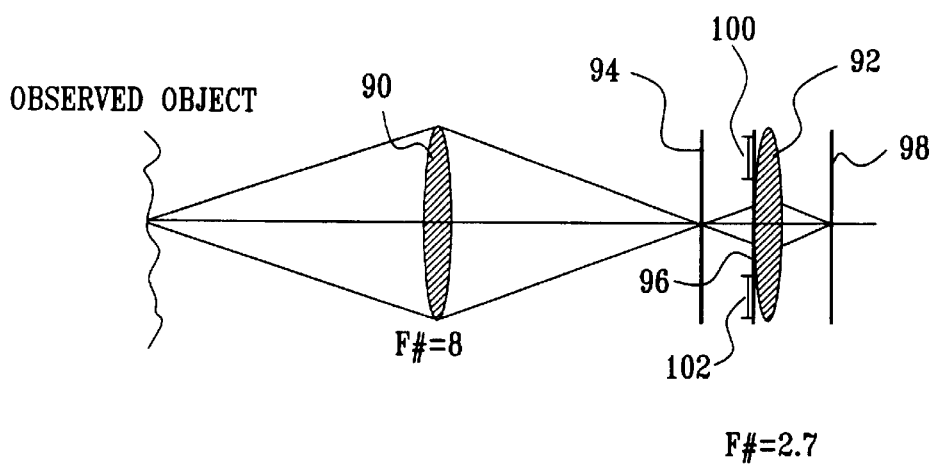
FIG. 7 is a schematic illustration of another optical arrangement for creating a panoramic field of view in accordance with an alternate embodiment of the invention.

A second alternate approach does not reduce the resolution of the obtained panoramic image and it is not sensitive to wide band illumination. However, it requires two special elements instead of one and it reduces the F number of the optical system. The arrangement is illustrated in FIG. 7. As mentioned it includes a first imaging lens 90, a second imaging lens 92, and two special elements. The first element, a prism 94, is placed in the intermediate image plane and the second element, a prism 96, is attached to the second imaging lens 92. The prism 94 is divided into regions that are to be relocated in the panoramic image that is created on a detector 98. In each region a prism is positioned such that its information is directed into different zones of the second imaging lens 92. Since we allow a reduction of the F number, the area of this lens will allow multiplexing of all the regions. In the lens plane another element is attached. It also consists out of prisms 100, 102 that correct the propagation direction of the spatial information arriving to the zones on the lens aperture. FIG. 7 illustrates an example for the case where the ratio between the horizontal and the vertical field of views is 9. The optical parameters of the arrangement are indicated in FIG. 7. The arrangement allows for sufficient space to perform spatial multiplexing.

Geometrical Super Resolution

Resolution of optical systems is restricted by various parameters. For example, optical imaging systems in a free space medium are limited by diffraction. The geometrical resolution of an imaging device depends on the pitch of its pixels and its focal length. This resolution may be improved if the image to be captured is recorded several times, provided that prior to each capture, a well controlled sub-pixel shift is executed. The resolution improvement relates to the number of captured images undergoing the sub pixel shift. The mathematical operation used for obtaining the super-resolved image out of the sub pixel-shifted images is a Gabor-like transform. A fully detailed description of this issue is provided in the above noted Israel patent application No. 129258; however in the interest of clarity, a brief discussion is now presented.

According to the preferred embodiment of the invention, the sensing device samples the object K times, each time with a subpixel shift in the captured object relative to the capture device by an amount $\Delta x/K$. Letting $u_k[n]$ denoted the detected energy of the $n^{th}$ pixel in the $k^{th}$ sampling, the detected energy is given by $$u_k[n] = \int_{-\infty}^{\infty} u\left(x + n\Delta x + k\frac{\Delta x}{K}\right)g(x)dx, \quad (14)$$

$$n = 0, 1, \ldots, N-1; k = 0, 1, \ldots, K-1.$$

Together, the various samples $u_k[n]$ provide KN samples given $$y[n] = \int_{-\infty}^{\infty} u\left(x + n\frac{\Delta x}{K}\right)g(x)dx, n = 0, 1, \ldots, KN-1. \quad (6)$$

This integral may be replaced by a discrete Gabor transform over u with window fu namely, $$y[n] = \sum_p g\left(p\frac{\Delta x}{K}\right)u\left((m-p)\frac{\Delta x}{K}\right). \quad (15)$$

In the preferred embodiment, geometrical super-resolution is achieved by using a special grating-like diffractive optical element. This element, which is attached to the imaging lens, creates replicas by spatial multiplication of the imaged scene on the detector array plane.

Figure 8:
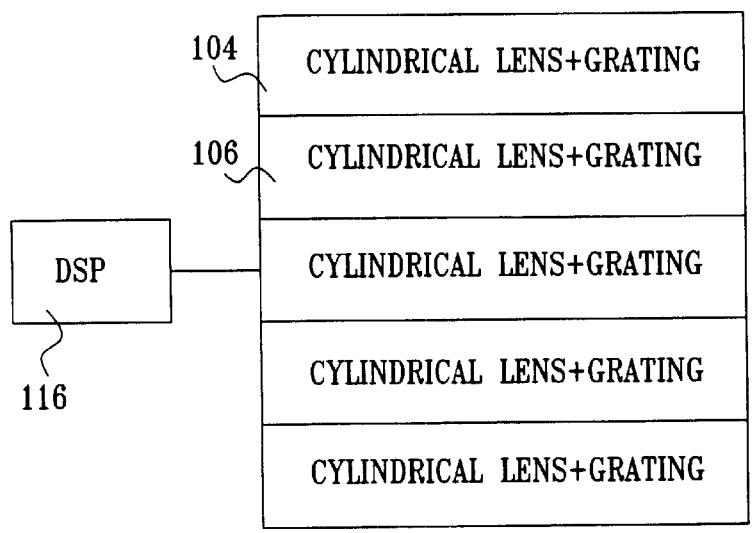
FIG. 8 is a block diagram of a system that includes the embodiment illustrated in FIG. 4.
Figure 9:
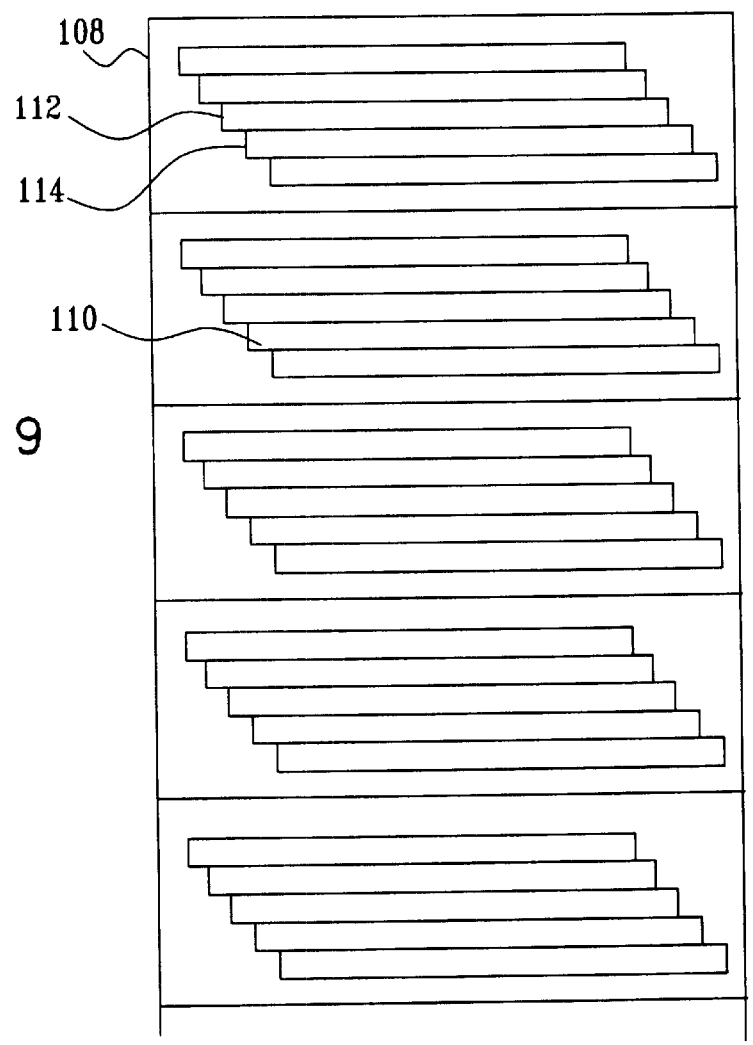
FIG. 9 illustrates subpixel shifting of replicas produced by the embodiment illustrated in FIG. 8.

Referring to FIGS. 8 and 9, there is schematically illustrated an aspect of the preferred embodiment, wherein an array of cylindrical lenses 104, 106 having gratings attached thereto are directed to a plurality of corresponding horizontally oriented strips 108, 110 of a scene. When the scene is captured multiple times, each image replica, for example the replicas 112, 114, captured in strip 108, have an appropriate horizontal subpixel shift with respect to their neighbors.

FIGS. 8 and 9 demonstrate the optical element and its effect on the detector array plane for the approach where the depth of focus is achieved with several strips each having a cylindrical lens with different focal lengths.

A digital signal processor 116 extracts the high resolution image, applying the Gabor-like operation over all the shifted replicas. For obtaining the desired Gabor-like operation a mask is attached to the sensor plane. Its aim is to avoid zeros in the spectral domain due to the non ideal sampling of information by the pixels of the detector. The practical advantages of applying the mask include the avoidance of division by zero operations, and the addition of frequencies in the spectral domain, which would otherwise not be seen. The details of this approach appear in the above noted Israel patent application No. 129258. Briefly, the mask is constructed in the form of a plurality of optically transparent slits using well known methods. The mask function is a spatial function m(x), preferably taking values 0 and 1, and its effect is to modify the pixel sensitivity function from g(x) to p(x)=g(x)m(x).

$$m(x) = 1 - \sum_{i=1}^{M} \text{rect}\left(\frac{x}{\delta x_i}\right) \otimes \delta(x - x_i), \quad (16)$$

where M is the total number of slits, $X_1, X_2, \ldots, X_M$, are the locations of the slits, $\delta x_i$ is the width of the $i^{th}$ slit, and $\otimes$ denotes convolution. The function rect() is given by $$\text{rect}(z) = \begin{cases} 1, & -1/2 < z < 1/2, \\ 0, & \text{otherwise} \end{cases} \quad (17)$$

Preferably, the value of M is a number between zero and the number of replicas, K. The values $\delta x$ are each approximately equal to the sub-pixel size $\Delta x/K$, where $\Delta x$ is the width of a pixel. The values of the mask m(x) are 0 inside the slits and 1 outside the slits, The total width of the mask is $\Delta x$. Although the spectral mask has been described in terms of a single dimension for charity of presentation, preferably the mask is a two-dimensional mask which covers a two dimensional array of detectors.

Figure 10:
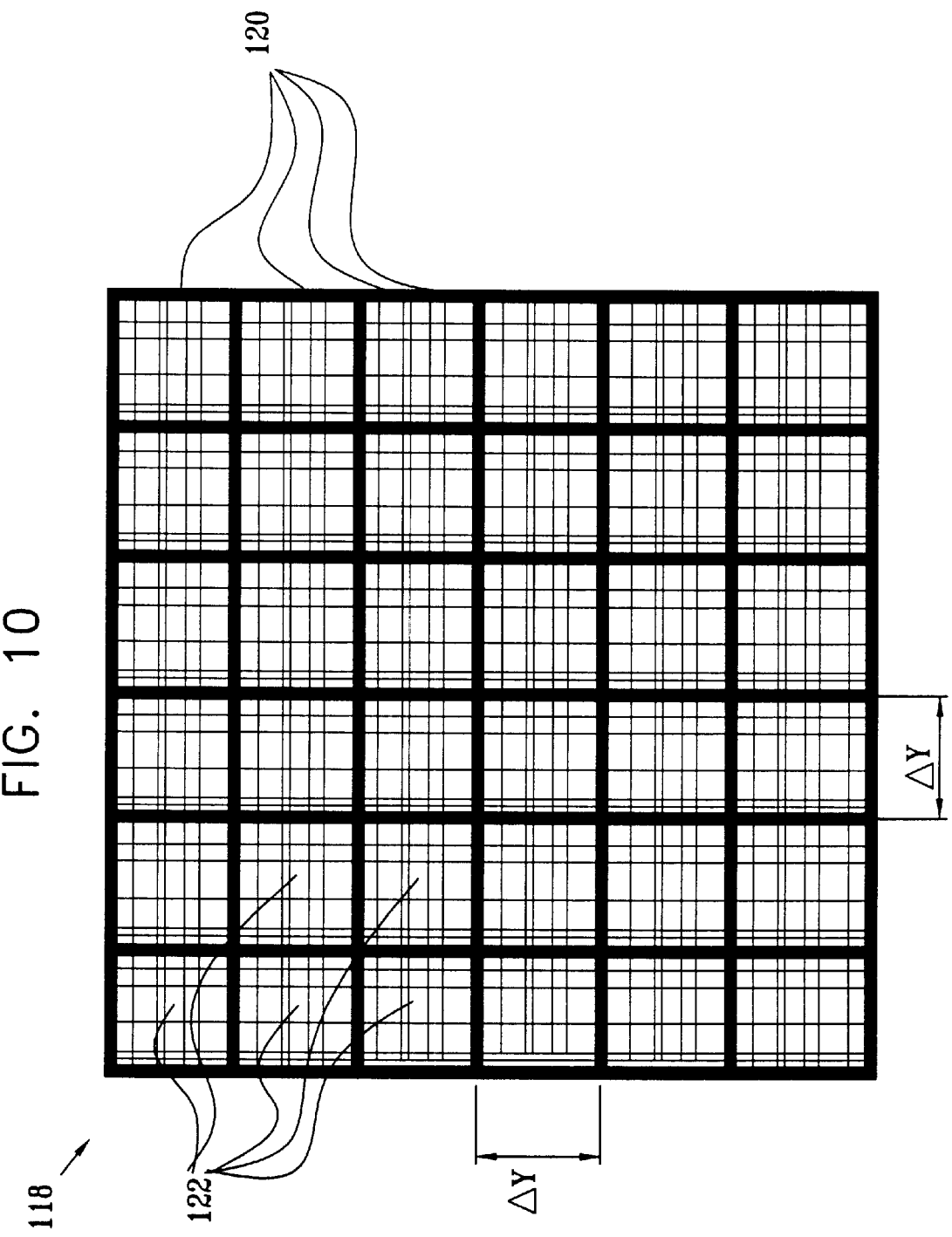
FIG. 10 illustrates a spatial mask applied to a detector in an imaging apparatus according to a preferred embodiment of the invention.

FIG. 10 is a simplified illustration of a mask attached to a sensor panel of array detectors in an image sensing device, in accordance with a preferred embodiment of the present invention. A sensor panel 118 in an image sensing device contains a two-dimensional array of detectors 120. Detectors 120 are depicted as individual cells within sensor panel 118. The array of detectors 120 is periodic, with periodic spacings Δx and Δy in the horizontal and vertical dimensions, respectively. The spacings Δx and Δy correspond to the pixel spacings in the sampled digital image obtained from the image sensing device. A masking pattern 122 in the form of a fine sub-pixel transmission grating is used to generate a doubly periodic mask, with respective periods Δx and Δy in the horizontal and vertical dimensions. In a preferred embodiment of the present invention, the doubly periodic mask is attached to sensor panel 118. Each of the detectors 120 is masked by the same masking pattern 122. It is possible in some applications to vary the focal power of the lenses such that the replicas will be properly focused in the image plane, utilizing the Scheimpflug arrangement 36 (FIG. 3) or the variants thereof which are disclosed hereinabove. If this is done, it is not necessary to use the digital signal processor 116.

Computer simulation:

The effectiveness of the preferred embodiment disclosed above is shown by a computer simulation. The software has taken into account the diffraction resolution, as limited by the F number of the imaging lens, the geometrical resolution, as a function of the size of the detector's pixels and the defocus problem created in the replicas due to the fact the detector plane is tilted with respect to the object plane, as seen schematically in FIGS. 4 and 5. In order to solve the defocus problem of the various replicas, the applied numerical algorithm modeled not only the geometrical super resolution technique discussed above, but also computed the deconvolution of the out-of-focus point spread functions of the various replicas. The deconvolution was performed in the form of Wiener filtering in the Fourier plane. Since the defocusing distortion may be computed according to the formula:

$$H(f_x) = \text{trian}(f_x)\text{sinc}\left[\left(\frac{8w}{\lambda}\frac{f_x}{2f_0}\right)\left(1 - \left|\frac{f_x}{2f_0}\right|\right)\right] \quad (18)$$

to where:

$$f_0 = \frac{F}{2\lambda b F_\#} \quad (19)$$

$$w = e\frac{F^2}{8F_\#^2}$$

$$e = \frac{1}{b} + \frac{1}{a+\delta s} - \frac{1}{F}$$

The correction filter has an inverse form, wherein $F_\#$ is the F number, F is the focal length of the imaging lens and δs is the amount of defocus obtained on the detector plane. Notating by dx the size of each pixel on the detector, and assuming that the vertical distance between each two replicas is 5 pixels, then:

$$\delta s = 5 dx \cos(B) \quad (20)$$

Figure 11:
FIG. 11 illustrates a bar code suitable for imaging in accordance with the invention.
Figure 12:
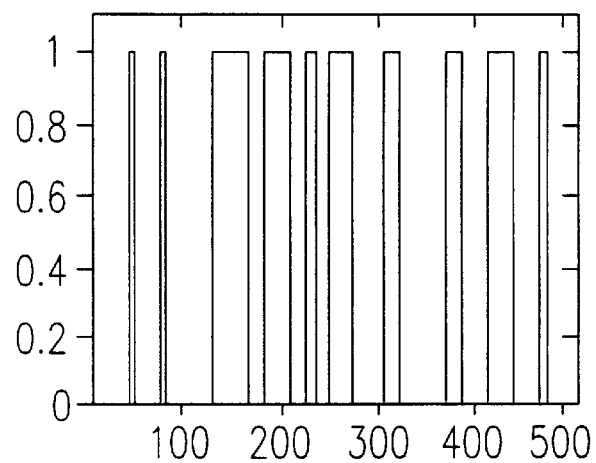
FIGS. 12, 13, 14, 15, 16, and 17 are plots of computer simulations that demonstrate the performance of preferred embodiments of the invention.
Figure 13:
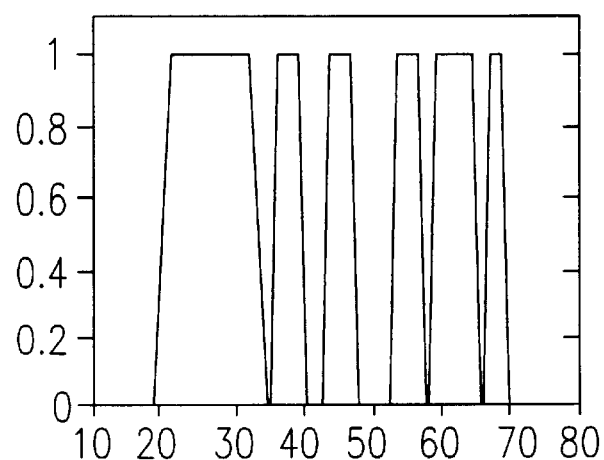
Figure 14:
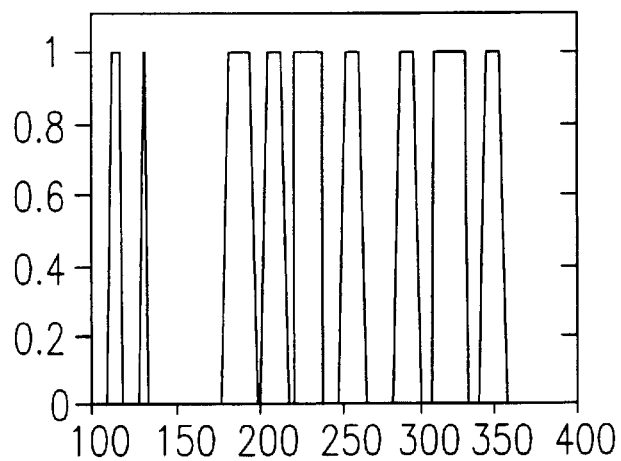

In the following examples bar code imaging was simulated, using a resolution improvement of 4 times. In the simulation the camera had 512 pixels with size of 12 microns. A=20 degrees, F=20 mm. , $F_{190}$=2 and the wavelength was 0.68 microns. FIG. 11 demonstrates the input barcode 124, a 15 mil barcode with d=55 mm. FIG. 12 shows a plot of the captured image, without application of the super-resolving algorithm. FIG. 13 illustrates conventional reconstruction, in which a threshold is applied to the defocused image obtained in the specific plane. FIG. 14 shows the result obtained after applying the algorithm combining geometrical-super resolution together with the Wiener defocusing correction. Those simulations were obtained at a range of b=1.6 m. One may see that the combined algorithm manages to cope with all the possible resolution distortions, including diffraction, geometrical distortion, and defocus.

Figure 15:
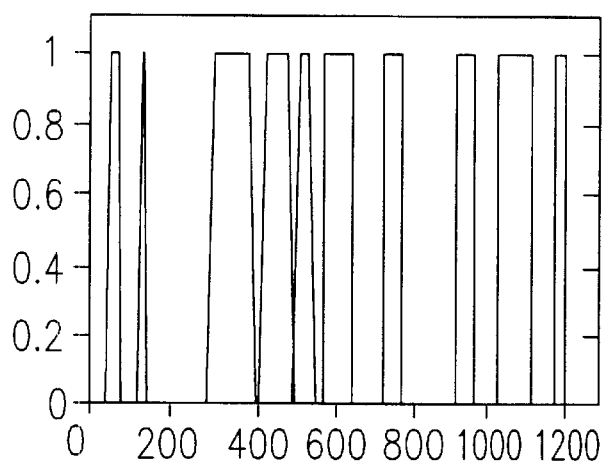

The algorithm can easily cope with close distance where super-resolution is much less required. For instance, in FIG. 15, where the simulation was performed under the condition that the range b=35 cm. and d=55 mm., a successful reconstruction may be seen.

Figure 16:
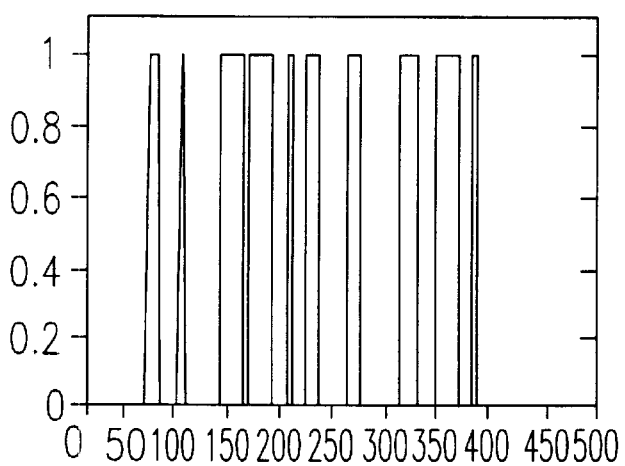
Figure 17:
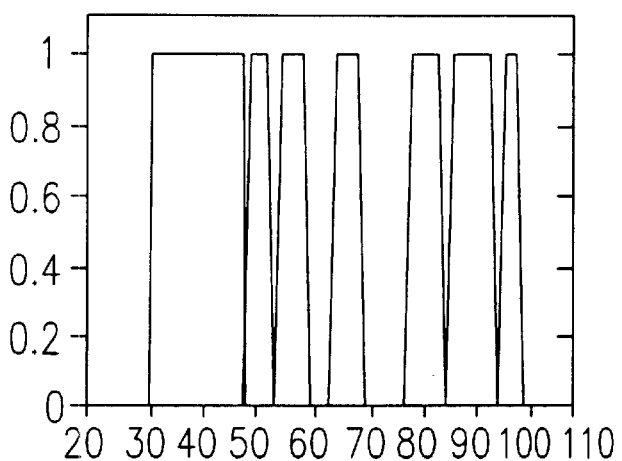

Decreasing the distance d decreases the angle B and make the defocus problem more severe. In FIG. 16 one may see the obtained results for b=1.2 m and d=40 mm. For comparison FIG. 17 presents the results obtained without applying the super-resolving algorithm.

In the above noted simulations, the out of focus problem of each replica is solved by the use of a numerical algorithm, the Wiener defocusing correction. In an alternate embodiment of the invention, instead of employing the numerical algorithm, proper focus for the replicas is obtained by designing the diffractive optical element such that a small optical power is added to each replica created therein. In this embodiment all the elements together create the desired depth of focus range. In this manner all the replicas are obtained in proper focus.

Figure 18:
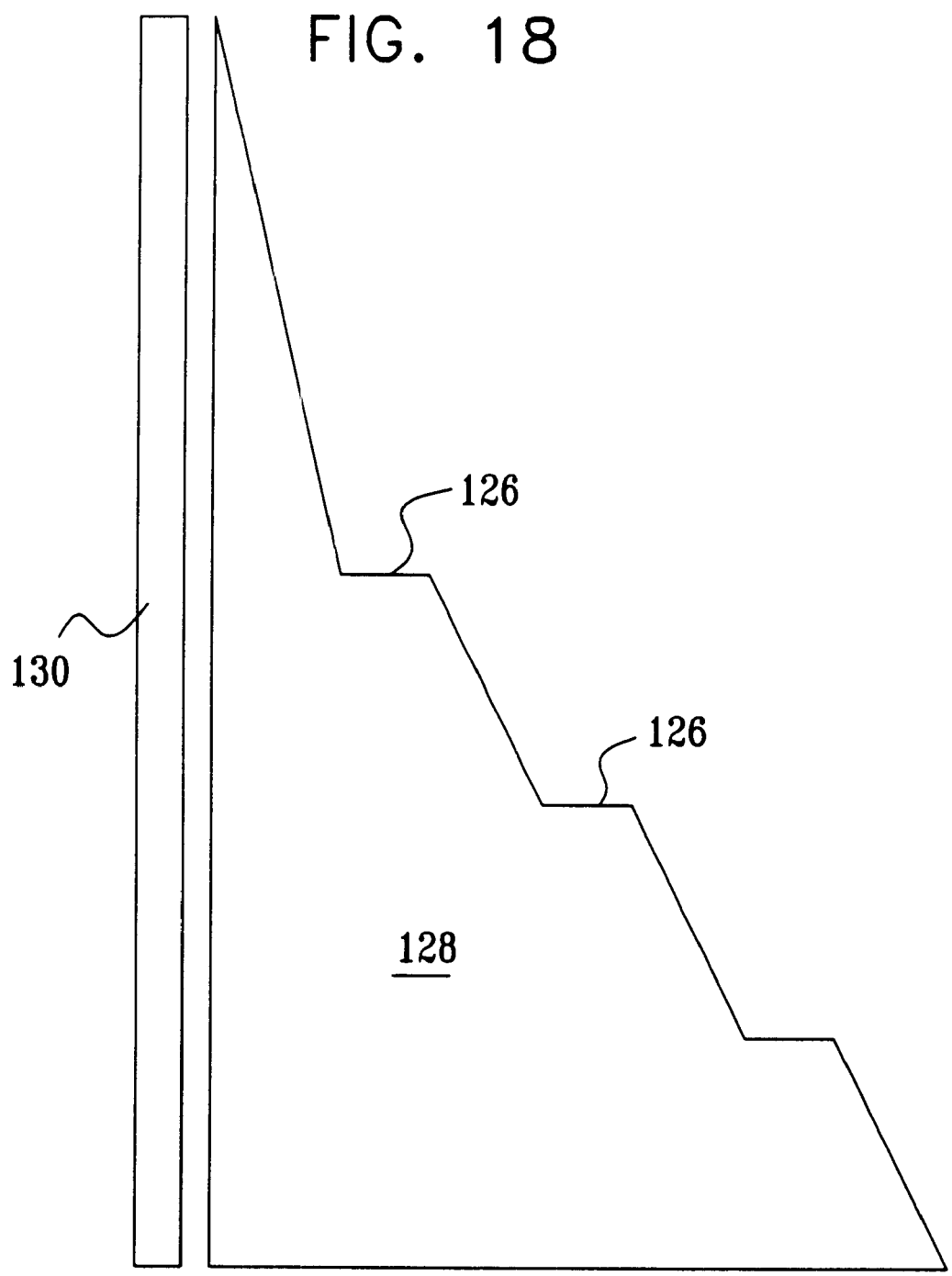
FIG. 18 is a sectional view of a stepped prism and detector array in accordance with an alternate embodiment of the invention.

Referring now to FIG. 18, in yet another alternate embodiment of the invention stairs 126 are formed in a prism 128 attached to detector array 130, so that all the replicas will have optical paths of equivalent length, and will be properly focused on the detector plane.

The technique according to the invention may be used in various applications such as vehicle detection and warning system and barcode scanners. The detector preferably contains an imaging device, such as a CCD array, which images desired horizontal and vertical fields of view. A high horizontal spatial resolution is extracted using a geometrical super resolution concept obtained using a special diffractive optical element which is attached to the lens and creates a replica of the imaged horizontal axis. In addition, as described in the above noted Israel patent application No. 129258, a special mask is attached to the sensor to prevent spectral zeros. Due to this mask, an efficient inverse filtering algorithm (Gabor like) is possible to be applied for extracting information at a high spatial resolution. A wide depth of focus is obtained using a set of strips with varied focal lengths or by a prism placed between the imaging plane and the imaging lens according to the modified Scheimpflug arrangement. In addition, instead of using a single prism, several prismatic strips may be used to obtain several traces with different focus depths. In this embodiment the special optical element attached to the imaging lens is also performs the vertical replication of a portion of the imaged scene that corresponds with the respective fields of view of each of the strips. This arrangement increases the system's robustness.

Figure 19:
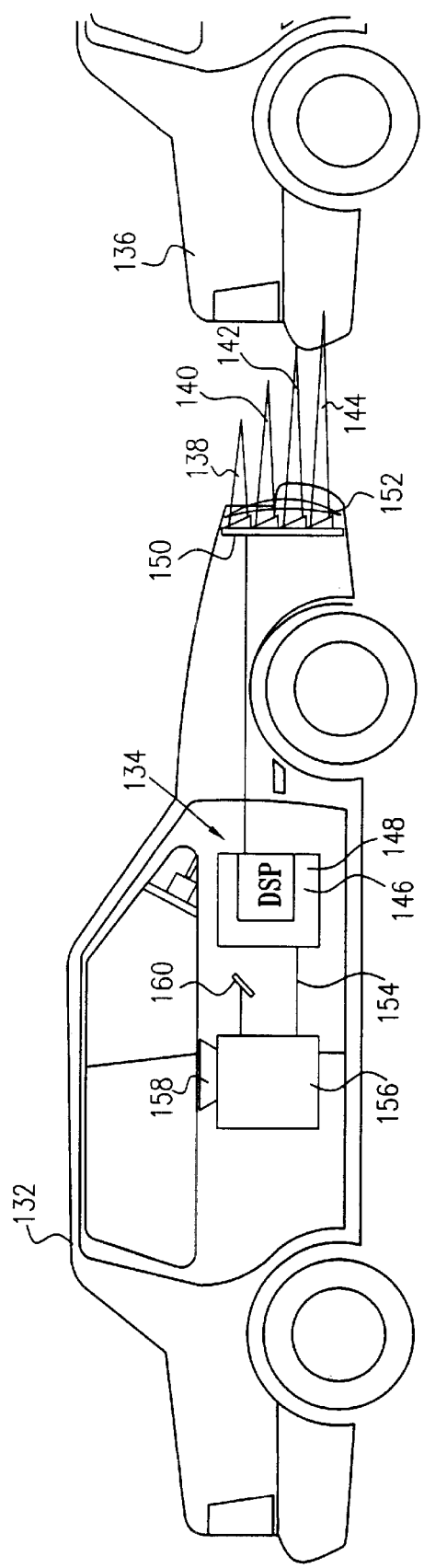
FIG. 19 schematically illustrates a collision avoidance system in accordance with the some aspects of the invention.

FIG. 19 illustrates an application of the imaging apparatus according to the invention in a collision avoidance system for motor vehicles. A vehicle 132, in which a collision avoidance system 134 is installed, is trailing a preceding vehicle 136 at a distance u. The collision avoidance system 134 employs one of the preferred embodiments of the invention as discussed above, having either several cylindrical lenses or several prisms. Each imaged strip 138, 140, 142, 144 presents information focused at a different depth. Thus, for small values of the distance u, focused information appears only in one of the stripes. The rear surface of the preceding vehicle 136 is properly focused by a particular strip 142. By identifying the strip in which information is focused, for instance by spatially deriving the information, one may approximate the distance u. Where v is the distance between the lens and the detector plane, one obtains:

$$\frac{1}{u} + \frac{1}{v} = \frac{1}{F} \quad (21)$$

and $$\delta v = -\frac{v^2}{u^2} \delta u \quad (22)$$

where F is the focal length. $\Delta u$ and $\Delta v$ are the variation in the distances. The extent of defocusing (variation in v) correlates with the distance estimation resolution using this approach (the variation in u).

The collision avoidance system 134 includes a computer 146, preferably employing a digital signal processor 148. The digital signal processor 148 receives signals from detector 150, responsive to the optical energy impinging thereon via the optics 152. The computer 146 is programmed by known techniques to respond to the output of the digital signal processor 148, and to compute the distance u. Responsive to the distance u, or to changes thereof, signals are transmitted via bus 154 from the computer 146 to a controller 156. If appropriate conditions of the distance u are fulfilled, the controller 156 may alert the operator of the vehicle 132 by activating an alarm 158, or in more sophisticated systems, by automatically actuating a control 160 of the vehicle 132 to vary its speed or direction.

Figure 20:
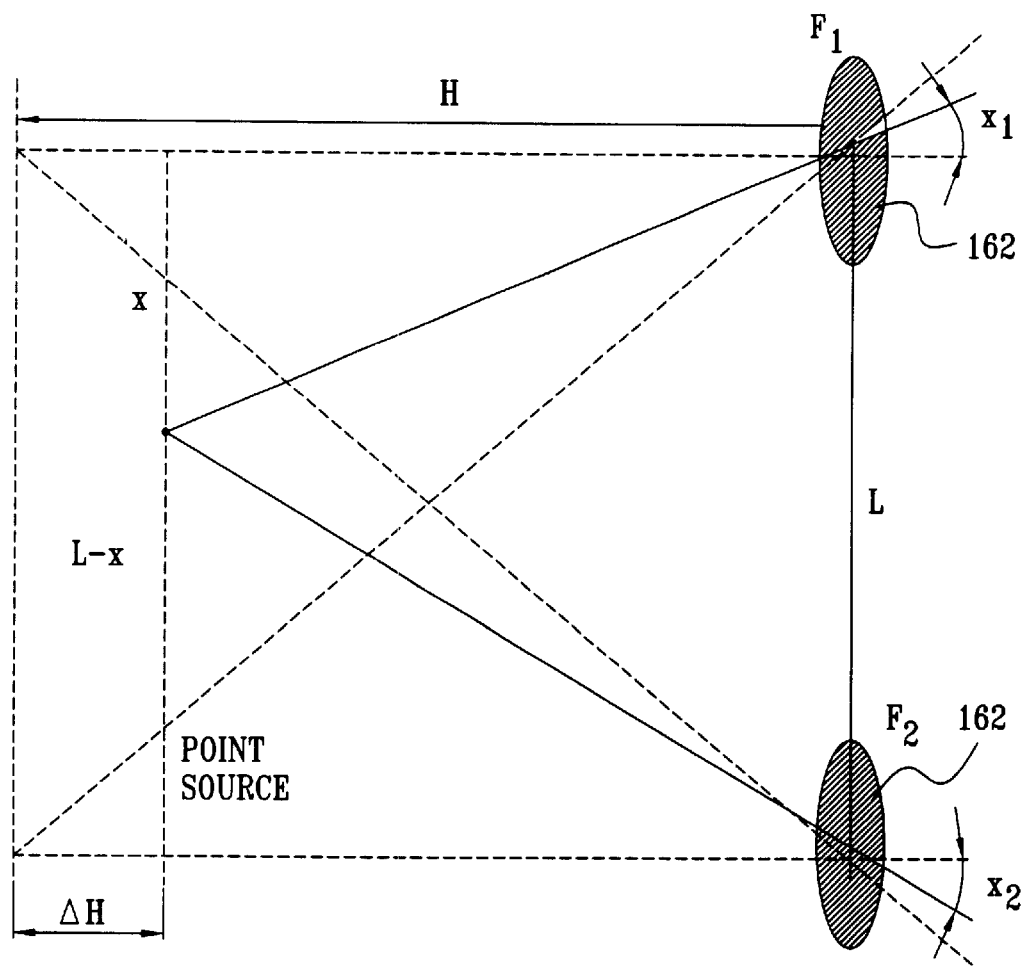
FIG. 20 is a schematic illustration of an alternate embodiment of the invention employing two lenses.

In another alternate embodiment of the invention, the distance from the target may be extracted using two cameras and the well known triangulation relation, as shown in FIG. 20. Optical elements 162 are each constructed according to one of the embodiments illustrated in FIG. 5 and FIG. 8.

$$\frac{x_1}{x} = \frac{F_1}{H - \Delta H} \quad (23)$$

$$\frac{x_2}{L - x} = -\frac{F_2}{H - \Delta H}$$

$$H - \Delta H = \frac{x(F_1 - F_2) + F_2 L}{x_1 - x_2}$$

Assuming $F_1 = F_2 = F$ one obtains:

$$\delta(H - \Delta H) = (\delta x_2 - \delta x_1) \frac{(H - \Delta H)^2}{LF} \quad (24)$$

where $\delta(H-\Delta H)$ is the depth resolution and $\delta x_{1,2}$ is the spatial position detection resolution on the detector plane. For instance, let us assume that the detector has pixels whose size is $\Delta x = 12 \mu m$ and the size of the detector plane is D=1.28 cm. If we wish to obtain a vertical field of view ("FOV") of 86 degrees (1.5 rad) it requires a focal length of:

$$F = \frac{D}{FOV} = \frac{1.28[\text{cm}]}{1.5[\text{rad}]} = 8.54[\text{mm}] \quad (25)$$

In this example, a resolution improvement of N=5 times is obtained, and it is also assumed that after applying a center of gravity finding algorithm, the position resolution is improved by another factor of 10:

$$\delta x = \frac{\Delta x / N}{10} = \frac{12 \mu m / 5}{10} = 0.25 \mu m \quad (26)$$

Thus $$\delta x_2 - \delta x_1 \leq 2 \times 0.25 \, \mu m = 0.5 \, \mu m \quad (27)$$

In yet another alternate embodiment of the invention triangulation may be obtained be accomplished by dividing the aperture plane of a single optical element. As shown in FIG. f17 an optical elements 164 is constructed according to one of the embodiments illustrated in FIG. 5 and FIG. 8, but is divided into two identical halves 166. The triangulation calculation is performed between the images captured on the two halves of the detector array panel 168.

The distance between the two images is half the detector plane size: L=D/2=6.4 mm. For targets located 25 meters from the camera the distance estimation resolution becomes:

$$\delta(H - \Delta H) = \frac{0.5 \mu m \times (25 m)^2}{6.4 \, mm \times 8.54 \, mm} = 5.5 \, m \quad (28)$$

A decrease in the fields of view will improve the depth estimation resolution.

Figure 21:
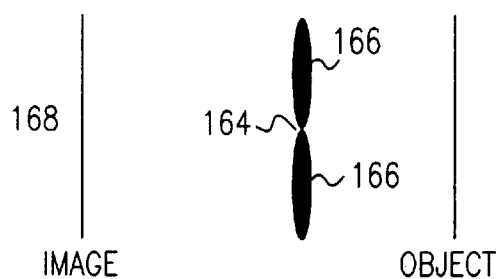
FIG. 21 is a schematic illustration of an alternate embodiment of the invention wherein a single lens is divided into two regions which are separately processed.

The solution presented in FIG. 21 may be combined with the Scheimpflug based concept disclosed above with respect to the first embodiment.

Computer simulations have been performed as discussed above. The simulations have taken into account the aperture's size and the diffraction limitations of propagating light, the geometrical limitations of the detector due to the finite size of its pixels, the replicas obtained on the detector plane, which are required for the geometrical super resolution approach, and the defocus effects resulting from the fact that different optical paths of the replicas lead to different areas of the tilted detector plane. The simulations have verified the suggested concept.

Another important issue to be discussed is related to computer vision algorithms which may be combined with optical data processing for extraction of the desired distance estimation. If organ optical Mellin coordinate transformation of (lnr, θ) are applied over the Cartesian input image, and a correlation operation is used for estimation, the obtained result yields scale and rotation invariant recognition. Such a property may be well used for extracting the TTI (time to impact) parameter. The suggested coordinate transformation may be implemented optically using the special optical elements disclosed herein. The transformations and computer vision algorithms are more fully described in the documents "Shift and Scale Invariant Pattern Recognition using Mellin Radial Harmonics," D. Mendlovic, E. Marom and N. Konforti, Opt. Commun. 67, 172–177 (1988); and "Optical Coordinate Transformation Methods And Optical Interconnection Architectures," D. Mendlovic and H. M. Ozaktas, Appl. Opt. 32, 5119–5124 (1993).

It is also possible to achieve the effect of diffraction to create replicas by techniques unrelated to diffraction—time multiplexing and wavelength multiplexing, in which case the imaging lens is made to vibrate on a platform. As previously mentioned, in order to obtain geometric super resolution a relative subpixel shift is required between the images. As disclosed above this shift was achieved by spatial multiplexing, that is by creation of multiple replicas at the expense of vertical pixels in the detector array. Instead one may, for instance use time multiplexing to obtain the set of images which are relatively shifted from one another by subpixel amounts. For example, if the camera is placed on a vibrating platform the relative shifts may be obtained due to the vibrations and, the set of the required images is accumulated with time. Another option is to encode each shifted image in a different wavelength and then to obtain all the images simultaneously in time and space. In this case it is the detector's responsibility to be able to distinguish between various wavelengths used for the multiplexing.

The above embodiments have been explained in terms of light energy. However the techniques disclosed herein are applicable with suitable modification to other forms of radiant energy, such as ultraviolet light, infrared, microwave energy, x-rays and radioactive emissions.

While this invention has been explained with reference to the structure disclosed herein, it is not confined to the details set forth and this application is intended to cover any modifications and changes as may come within the scope of the following claims.

What is claimed is:

1. A method of imaging, comprising the steps of:
   tilting an image plane with respect to an object plane;
   defining pixel units on said image plane;
   defining a field of view on said object plane, wherein a vertical dimension of said field of view differs from a horizontal dimension thereof;
   forming a plurality of images of said field of view on said image plane, said images being spatially interrelated by sub-pixel shifts; and
   super-resolving said images into an enhanced image.

2. The method according to claim 1, wherein said step of super-resolving is geometrically performed by transforming said images according to a Gabor transform.

3. The method according to claim 2, wherein said step of super-resolving further comprises applying a spatial mask to said image plane.

4. The method according to claim 3, wherein said spatial mask is given by a function $$m(x) = 1 - \sum_{i=1}^{M} \text{rect}\left(\frac{x}{\delta x_i}\right) \otimes \delta(x - x_i),$$

wherein M is a total number of slits of said mask, $X_1$, $X_2$, ..., $X_M$, are locations of said slits, $\delta x_i$ is a width of an $i^{th}$ slit, and $\otimes$ denotes convolution; and
rect( ) is given by $$\text{rect}(z) = \begin{cases} 1, & -1/2 < z < 1/2, \\ 0, & \text{otherwise.} \end{cases}$$

5. The method according to claim 1, wherein said images are oriented according to a larger of said horizontal dimension and said vertical dimension.

6. The method according to claim 1, further comprising deconvolving out-of-focus point spread functions of said images.

7. The method according to claim 6, wherein said step of deconvolving is performed by a Wiener filter.

8. The method according to claim 1, wherein said plurality of images are formed by time multiplexing.

9. The method according to claim 1, wherein said plurality of images are formed by wavelength multiplexing.

10. The method according to claim 1, wherein said plurality of images are formed by diffractive gratings.

11. The method according to claim 1, further comprising the steps of transforming said plurality of images according to a Mellin transform to define transformed images, and performing a time-to-impact analysis on said transformed images.

12. The method according to claim 1, wherein said step of forming a plurality of images further comprises:
   spatially transforming coordinates of said plurality of images to establish a panoramic field of view, said panoramic field or view comprising a horizontal field of view and a vertical field of view, wherein a magnitude of said horizontal field of view differs from said magnitude of said vertical field of view.

13. A method of imaging comprising the steps of
   simultaneously viewing a plurality of elongated fields of view on a target, wherein a focus of each of said fields of view has a different optical displacement from an imaging surface;
   diffracting beams of radiant energy that travel along a path extending between said fields of view and said imaging surface to form elongated replicas of each of said fields of view, said replicas being mutually shifted in a direction of elongation thereof, and being mutually displaced in a direction that is substantially transverse to said direction of elongation; and
   combining said replicas of each of said fields of view into corresponding enhanced images, each of said enhanced images having a higher resolution than resolutions of its associated replicas.

14. The method according to claim 13, further comprising the steps of:
   forming an image plane that is tilted with respect to planes of said fields of view; and
   determining defocus of said fields of view.

15. The method according to claim 14, wherein said step of combining is performed by performing a Gabor transform on said replicas.

16. The method according to claim 14, wherein said step of combining is performed by performing a Mellin transform on an image comprising all of said replicas.

17. The method according to claim 14, further comprising deconvolving out-of-focus point spread functions of said images.

18. The method according to claim 17, wherein said step of deconvolving is performed by a Wiener filter.

19. The method according to claim 14, further comprising the step of conducting said beams through a spatial mask that is constructed such that zero values of a Fourier transform of a function representing spatial responsivity of pixels on said image plane are eliminated.

20. A method of imaging, comprising the steps of:
   tilting an image plane with respect to a first object plane and a second object plane, wherein a displacement of said second object plane from said image plane is greater than a displacement of said first object plane from said image plane;
   defining pixel units on said image plane;
   defining a first field of view on said first object plane, and defining a second field of view on said second object plane, wherein vertical dimensions of said first field of view and said second field of view differ from respective horizontal dimensions thereof;
   forming a plurality of first images of said first field of view on said image plane, said first images being spatially interrelated by sub-pixel shifts;
   simultaneously forming a plurality of second images of said second field of view on said image plane, said second images being spatially interrelated by sub-pixel shifts;

super-resolving said first images into a first enhanced image, and super-resolving said second images into a second enhanced image; and comparing a defocus magnitude of said first field of view with a defocus magnitude of said second field of view.

21. The method according to claim 20, wherein said first field of view is obtained through a first region of a lens, and said second field of view is obtained through a second region of said lens.

22. The method according to claim 20, wherein said step of super-resolving is geometrically performed by transforming said first images and said second images according to a Gabor transform.

23. The method according to claim 22, wherein said step of super-resolving further comprises applying a spatial mask to said image plane.

24. The method according to claim 23, wherein said spatial mask is given by a function $$m(x) = 1 - \sum_{i=1}^{M} \text{rect}\left(\frac{x}{\delta x_i}\right) \otimes \delta(x - x_i),$$

wherein M is a total number of slits of said mask, $X_1$, $X_2$, ..., $X_M$, are locations of said slits, $\delta x_i$ is a width of an $i^{th}$ slit, and $\otimes$ denotes convolution; and
rect( ) is given by $$\text{rect}(z) = \begin{cases} 1, & -1/2 < z < 1/2, \\ 0, & \text{otherwise.} \end{cases}$$

25. The method according to claim 20, wherein said plurality of first images and said plurality of second images are oriented according to a larger of said horizontal dimension and said vertical dimension.

26. The method according to claim 20, further comprising determining a displacement between said image plane and said target responsive to said step of comparing a defocus magnitude.

27. The method according to claim 20, further comprising deconvolving out-of-focus point spread functions of said first images and said second images.

28. The method according to claim 27, wherein said step of deconvolving is performed by a Wiener filter.

29. The method according to claim 20, wherein said first images and said second images are formed by time multiplexing.

30. The method according to claim 20, wherein said first images and said second images are formed by wavelength multiplexing.

31. The method according to claim 20, wherein said first images and said second images are formed by diffractive gratings.

32. The method according to claim 20, further comprising the steps of by transforming said first images and said second images according to a Mellin transform to produce a transformed first image and a transformed second image,and performing a time-to-impact analysis on said transformed first image and said transformed second image.

33. The method according to claim 20, wherein said first images and said second images are spaced apart, and further comprising determining a position of a target with respect to said first images and said second images by triangulation.

34. An imaging apparatus, comprising:
a lens having a field of view that includes an object plane, wherein a horizontal dimension of said field of view differs from a vertical dimension thereof;

a detector of radiant energy having an image formed thereon by said lens, said detector comprising a plurality of pixel elements;

a spatial mask disposed proximate said detector, said mask having a plurality of subpixel apertures formed therein;

a diffractive element disposed proximate said lens, wherein a diffracted light beam forms said image on said detector, and said image comprises a plurality of focused replicas of said field of view, said focused replicas being offset from one another by subpixel shifts; and prism disposed between said lens and said detector for refracting radiant energy passing therethrough onto said detector.

35. The apparatus according to claim 34, wherein said spatial mask is formed so as to eliminate zero values from a Fourier transform of a response function of said pixel elements.

36. The apparatus according to claim 34, wherein said diffractive element comprises a one dimensional zone plate strip.

37. The apparatus according to claim 34, wherein said lens comprises means for spatially transforming said plurality of focused replicas to establish said horizontal dimension and said vertical dimension as a panoramic field of view on said detector.

38. The apparatus according to claim 34, wherein said replicas are mutually shifted in a direction of elongation of said field of view, and are spaced apart from one another in a direction that is substantially transverse to said direction of elongation.

39. The apparatus according to claim 34, further comprising a signal processing unit which is responsive to said detector, and is programmed to combine said replicas into a single image having a greater resolution than said replicas.

40. The apparatus according to claim 39, wherein said signal processing unit performs a Gabor transform on a signal output of said detector.

41. The apparatus according to claim 39, wherein said signal processing unit performs a Mellin transform on a signal output of said detector.

42. The apparatus according to claim 39, wherein said lens comprises a first lens and a second lens spaced apart therefrom.

43. The apparatus according to claim 42, wherein said signal processing unit is programmed to determine a displacement by triangulation of a target using a first image thereof obtained from said first lens and a second image thereof obtained from said second lens.

44. The apparatus according to claim 43, wherein said signal processing unit is responsive to said first image and said second image on said detector.

45. The apparatus according to claim 39, wherein an aperture of said lens is divided into a first region and a second region, wherein said signal processing unit is programmed to determine a displacement by triangulation of a target, using a first image thereof obtained from said first region of said lens and a second image thereof obtained from said second region of said lens.

46. An imaging apparatus, comprising:
a plurality of lenses each having a corresponding field of view that includes an object plane, wherein a horizontal dimension of said field of view differs from a vertical dimension thereof, said lenses having different focal lengths;

a detector of radiant energy having a plurality of corresponding images formed thereon by said lenses, said detector comprising a plurality of pixel elements;

a spatial mask disposed proximate said detector, said mask having a plurality of subpixel apertures formed therein;

a diffractive element disposed proximate each of said lenses, wherein each said corresponding image on said detector comprises a plurality of focused replicas of said corresponding field of view, said focused replicas being offset from one another by subpixel shifts; and a prism disposed between said lens and said detector for refracting radiant energy passing therethrough onto said detector.

47. The apparatus according to claim 46, wherein said prism comprises a plurality of prisms, each said prism refracting radiant energy that is received from a corresponding said lens.

48. The apparatus according to claim 46, wherein said spatial mask is formed so as to eliminate zero values from a Fourier transform of a response function of said pixel elements.

49. The apparatus according to claim 46, wherein said diffractive element comprises a one dimensional zone plate strip.

50. The apparatus according to claim 46, wherein said replicas are mutually shifted in a direction of elongation of said corresponding field of view, and are spaced apart from one another in a direction that is substantially transverse to said direction of elongation.

51. The apparatus according to claim 46, further comprising a signal processing unit which is responsive to said detector, and is programmed to combine said replicas of each said field of view into a corresponding single image having a greater resolution than said replicas.

52. The apparatus according to claim 51, wherein said signal processing unit performs a Gabor transform on a signal output of said detector.

53. The apparatus according to claim 51, wherein said signal a processing unit performs a Mellin transform on a signal output of said detector.

54. The apparatus according to claim 51, wherein said signal processing unit deconvolves out-of-focus point spread functions of said images.

55. The method according to claim 54, wherein said signal processing unit employs a Wiener filter for deconvolving said point spread functions.

* * * * *